United States Patent

[11] 3,576,998

| [72] | Inventors | Marshall E. Deutsch<br>Sudbury;<br>Louis W. Mead, Lexington; Zoltan Nagy,<br>Quincy, Mass. |
|---|---|---|
| [21] | Appl. No. | 594,713 |
| [22] | Filed | Nov. 16, 1966 |
| [45] | Patented | May 4, 1971 |
| [73] | Assignee | Nen-Picker Radiopharmaceuticals, Inc.<br>Boston, Mass. |

[54] SELF CONTAINED, CLOSED SYSTEM AND METHOD FOR GENERATING AND COLLECTING A SHORT LIVED DAUGHTER RADIONUCLIDE FROM A LONG LIVED PARENT RADIONUCLIDE
47 Claims, 5 Drawing Figs.

[52] U.S. Cl. .................................................. 250/106,
    23/337, 176/16
[51] Int. Cl. .................................................. G21g 5/00
[50] Field of Search .......................................... 250/106(T);
    176/16; 23/337; 128/214.2

[56] References Cited
UNITED STATES PATENTS

| 2,847,007 | 8/1958 | Fox | 128/214.2 |
| 3,440,423 | 4/1969 | Bruno et al. | 250/106T |
| 3,446,965 | 5/1969 | Ogier et al. | 250/106T |
| 2,968,721 | 1/1961 | Shapiro et al. | 250/106TX |
| 3,369,121 | 2/1968 | Bruno et al. | 250/106T |

*Primary Examiner*—Archie R. Borchelt
*Assistant Examiner*—Morton J. Frome
*Attorney*—Dike, Thompson & Bronstein ABSTRACT: A sterile, pyrogen free, self-contained closed radionuclide generator system in which the eluant for extracting the daughter from the generator column, containing the parent and daughter on a supporting substrate, is prepackaged and stored in a predetermined amount in a sealed, flexible, collapsible plastic bag. The bag is sealably connected to the generator column by a conduit. The eluant is drawn from the bag through the generator column and is automatically withdrawn from the column and collected as an eluate of the daughter in the eluant by impaling a pierceable wall of a sealed evacuated eluate collecting tube on a cannula which is sealably connected to the generator to thereby apply a vacuum to the eluant in the bag to draw it through the generator and cannula into the evacuated eluate collecting tube.

INVENTORS
MARSHALL E. DEUTSCH
LOUIS W. MEAD
ZOLTAN NAGY
BY Dike, Thompson & Bronstein
ATTORNEYS

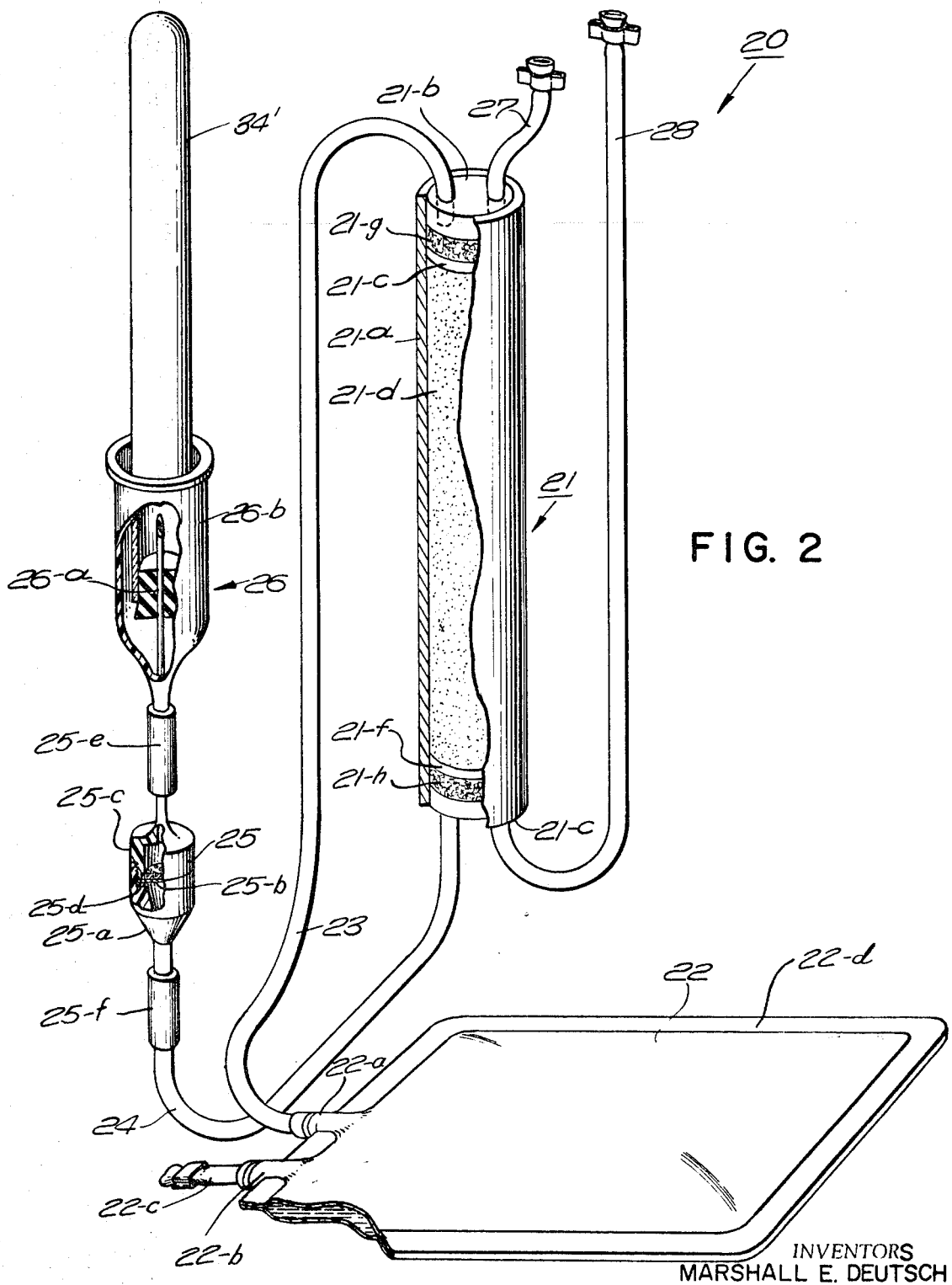

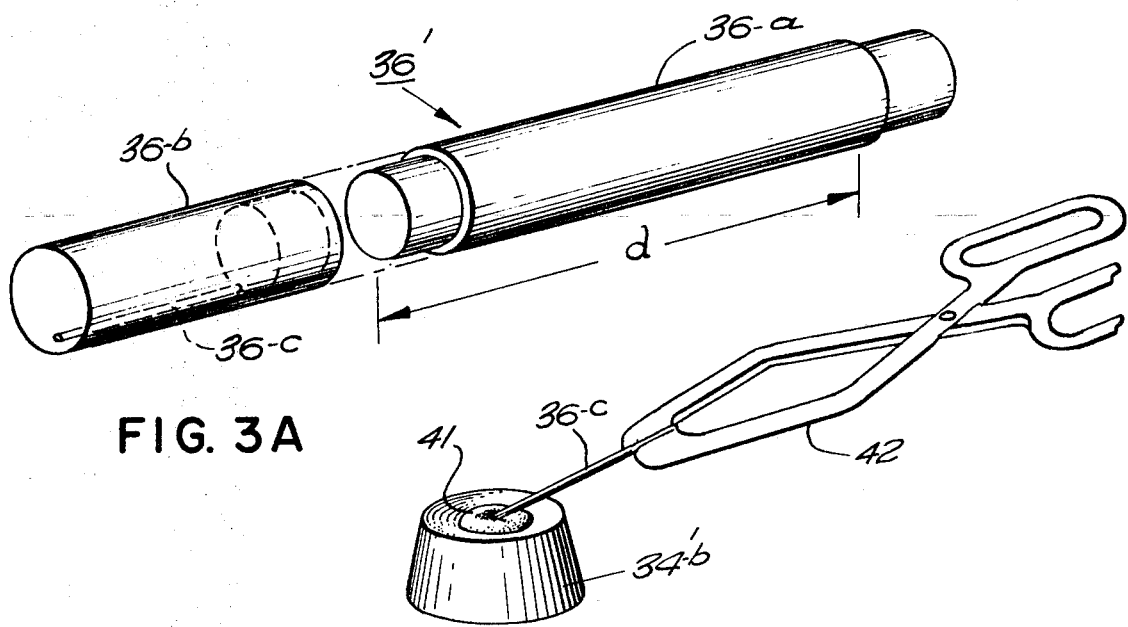
FIG. 3A
FIG. 3B
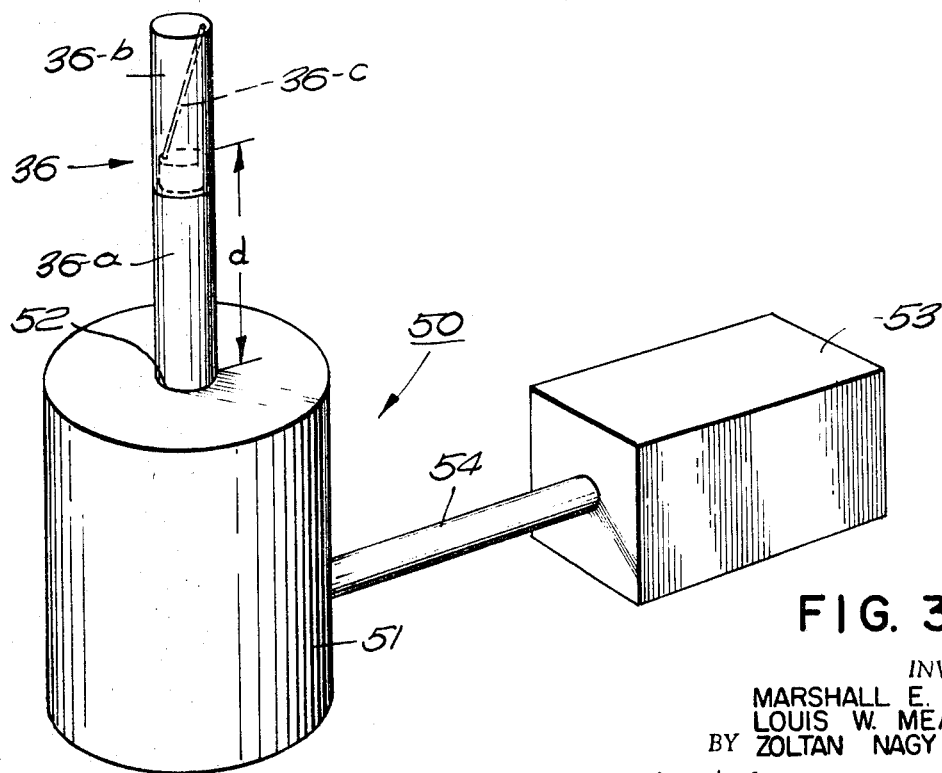
FIG. 3C
INVENTORS
MARSHALL E. DEUTSCH
LOUIS W. MEAD
BY ZOLTAN NAGY
*Dike, Thompson, & Bronstein*
ATTORNEYS

SELF-CONTAINED, CLOSED SYSTEM AND METHOD FOR GENERATING AND COLLECTING A SHORT-LIVED DAUGHTER RADIONUCLIDE FROM A LONG-LIVED PARENT RADIONUCLIDE

This invention relates to the generation and testing of radionuclides, and more particularly, to the generation and testing of radionuclides for use in nuclear medicine.

Radionuclides, which are also known as radioisotopes, are species of chemical elements which spontaneously emit particles an radiation. Such radionuclides have widespread application as sources of radiation for photographic and medical purposes. They are also used as tracers and scanners in physical and chemical systems, and in nuclear medicine. By monitoring the radiation emanated by radionuclides, it is possible to determine the status of systems containing them.

In nuclear medicine, for example, radionuclides are used in scanning and in visualizing the condition of various tissues and organs. Certain tumors and malignancies have a tendency to absorb some radioactive substances to a greater extent than healthy tissue. Hence, the degree of which an injected radionuclide substance becomes localized can indicate both the presence and extent of a malignancy.

Radionuclides which are used in conjunction with physical and chemical systems may be obtained directly from a nuclear reactor. Radionuclides obtained in that way often have to be transported an appreciable distance to reach their point of use. This necessitates elaborate shielding arrangements and considerable complexity in adapting the radionuclides for local use.

Moreover, in certain situations it is desirable for the radionuclides to produce radiation over a relatively short period of time. Otherwise, as in nuclear medicine, there could be excessive radiation exposure. In addition, the use of short-lived radionuclide substances permits a higher degree of control over processes in which radiation is employed.

When short-lived radionuclides are obtained directly from a nuclear reactor, they can decay excessively before they reach their destination.

As an alternative to being obtained directly from a reactor, short-lived radionuclides can also be generated locally as selected by-products of radioactive decay. Thus, a "daughter" radionuclide with a relatively short half-life can result from the spontaneous decay of a longer-lived "parent". The half-life of a radionuclide represents the period of time required for one-half of its atoms to decay to another form of matter. When needed, the daughter radionuclide is selectively extracted from a generating chamber containing the parent.

In the equilibrium state of the radionuclides contained in a local generating chamber, the apparent half-life of the daughter is the same as that of the parent. Hence, the generating chamber provides a readily accessible local source of a daughter radionuclide with a relatively long half-life, but which, upon being extracted, has a relatively short working life. Of course, for some situations the time relationship is desirably reversed, and a relatively short-lived parent is used in generating a longer-lived daughter.

Using conventional techniques for generating a daughter radionuclide on demand, the parent is contained in the generating chamber on a suitable substrate. The desired daughter radionuclide is then selectively extracted from the chamber by a solvent that is commonly known as an "eluant". During its passage through the chamber, the eluant forms an "eluate" with the daughter radionuclide. This process is commonly known as "milking" and the generating unit is colloquially known as a "cow". It is apparent that milking is advantageous only insofar as the complexity of the milking process does not exceed the difficulties and limitations encountered in the direct use of radioactive substances.

Among the disadvantages of using conventional radionuclide generators is that a large number of separate steps is required in preparing and applying a suitable eluant and in shielding the generating chamber. Shielding is a problem not only in the use of the generator but also in loading the chamber with the parent radionuclide. Moreover, the fact that the local generation of a daughter radionuclide entails a large number of distinctive steps makes it possible for contaminants to appear at various stages of the generating process.

Such contaminants pose a particularly acute problem in nuclear medicine where radionuclide substances that are injected into the body are desirably sterile and free from pyrogens. The latter are heat-resistant polysaccharides that result from bacterial activity. A satisfactory degree of freedom from many contaminants, such as atmospheric bacteria, can usually be achieved by using conventional sterile techniques. However, with heat-resistant bacterial substances like pyrogens, the usual measures taken to insure sterile conditions often have little or no effect.

Another form of contamination that can attend the local generation of a daughter radionuclide is the undesired presence of its parent. In nuclear medicine, for example, a high degree of control is required with respect to any radionuclide substance injected into the body, either for scanning or for radiation therapy. The undesired presence of a long-lived parent radionuclide in a situation calling for a shorter-lived daughter can often produce serious and uncontrollable physical deterioration.

Aside from contamination, the radiation hazards associated with radionuclides require that their radioactivity be measured with precision. Direct measuring instruments of suitable precision are often not available at local sites. In any case, it is desirable, and sometimes necessary to adapt a sample of a locally generated radionuclide for monitoring by commonly available instrumentation. This is conventionally accomplished by successive dilutions of a sample until its radioactivity is within the range of the monitoring instrument. Not only is this procedure time-consuming but the possibility of error is increased to the extent that a large number of dilutions is required.

Accordingly, it is an object of the invention to facilitate the local generation of radionuclides. A related object is to facilitate the generation of radionuclides for use in nuclear medicine. Another related object is to derive a relatively short-lived radionuclide daughter from a longer-lived parent. Still another related object is to prevent the use of extractive fluids of incorrect composition and amount in the local generation of radionuclides. A particular object is to prevent the use of eluants of incorrect composition and strength in separating a radionuclide daughter from its parent. A further related object is to control the rate of flow of an extractive fluid used in the local generation of radionuclide substances.

A further object of the invention is to reduce the number of stages of handling required for the local generation of radionuclides. A related object is to provide for the local generation of radionuclides in a semiautomatic fashion.

Still a further object of the invention is to provide a self-contained generator for radionuclides. A related object is to provide a radionuclide generator in which the hazard of radiation exposure is reduced. Another related object is to provide a self-contained generator which is adapted to reduce the number of accessories needed to establish the suitability of the ultimate product of the generator.

A yet further object of the invention is to reduce the contamination normally incident to the generation of a desired radionuclide. A related object is to facilitate the pyrogen-free generation of radionuclides for use in nuclear medicine. Another related object is to control the level of bacterial contamination attending the generation of a desired radionuclide.

Still a further object of the invention is to simplify the procedure for testing the suitability of a generated radionuclide substance. A related object is to simplify the procedure for measuring radioactivity of locally generated radionuclide substances. A further related object is to reduce the number of steps needed in measuring the radioactivity of such substances. Still another related object is to facilitate the precision measurement of highly radioactive substances with a relatively low-range measuring instrument. Another related object is to simplify the procedure for testing for the presence of an undesired radionuclide in the product of a radionuclide generator. A particular object is to simplify the procedure for testing for the presence of a radionuclide parent in an eluate containing a radionuclide daughter.

In accomplishing the foregoing and related objects, the invention provides a semiclosed generating system in which a chamber containing radionuclides is sealably connected to a closed, nonvented source of extractive fluid. The fluid passes into an inlet port of the chamber as required to selectively extract one of the radionuclides and carry it by way of an outlet port to an outlet member. Because the source is closed and sealably connected to the chamber, the extractive fluid is largely unaccompanied by contaminants that would otherwise be present. Where the source is of sterile and pyrogen-free composition, the resulting system is particularly suitable for use in nuclear medicine to generate a relatively short-lived daughter radionuclide from a longer-lived parent. Since the source is closed, the extractive fluid is of predetermined composition and amount. This prevents the inadvertent use of an incorrect fluid and an excessive amount of fluid.

The outlet member is adapted so that with a collector for the desired radionuclide attached, a difference in pressure between the collector and the source causes the extractive fluid to flow from the source through the chamber and into the collector. The difference in pressure is desirably achieved by having the collector take the form of an evacuated container and the source have a flexible sidewall. Such a generating system is semiautomatic in that the single step of attaching the collector brings about the elution of a desired radionuclide substance. In addition, with the collector attached to the outlet member, the generating system is completely closed, facilitating the realization of a radionuclide end-product that is substantially free from contamination.

In one embodiment of the invention the outlet member includes a cannula and the collector is an evacuated container, which is adapted to sealingly engage the cannula. The source is nonvented and has a flexible sidewall; it contains an eluant of predetermined composition and amount. The chamber contains a parent radionuclide that is supported by a substrate, and is connected from its inlet port to the source by an inlet conduit and from its outlet port to the outlet member by an outlet conduit. When the evacuated container engages the cannula, eluant is drawn from the source by collapse of its sidewall, due to the vacuum effect of the evacuated container, along the inlet conduit into the chamber, where it selectively extracts a daughter radionuclide and forms an eluate that passes along the outlet conduit through the cannula to fill the container. Where the parent radionuclide is radioactive molybdenum-99, precipitated on an alumina substrate, and the eluant is a saline solution contained in a sterile, pyrogen-free source, the daughter radionuclide in the eluate is radioactive technetium-99m which is suitable for use in nuclear medicine.

The chamber advantageously contains at least one filter and is in the form of an elongated cylinder in order to retain the substrate and to promote the uniform distribution of the eluant and avoid a breakdown by which the parent radionuclide could appear in the eluate during elution. Control over the rate of flow of the eluant is desirably exercised by the use of a microporous filter between the chamber and the outlet member. The microporous filter also promotes the realization of a relatively bacteria-free eluate end-product.

In accordance with one aspect of the invention, the generating system is disposed in a container to form a self-contained generator unit. The chamber of the generating system is shielded to attenuate radiation and is spaced from an interior wall surface of the container. The spacer thus provides an additional reduction in the level of radiation exterior to the container. Moreover, the spacer is advantageously proportioned to receive various accessories which are used in collecting the desired radionuclide substance and in testing its suitability for use.

In a particular embodiment of the invention the shield for the chamber takes the form of a lead cylinder which is spaced from a cylindrical wall surface of a canister container by a foam-plastic cylinder. The latter includes numerous wells for receiving various collectors and testing components, and a well for a cannular outlet member of the generating system. To promote the passage of the eluant through the chamber, a source of extractive fluid, in the form of a plastic bag is positioned at the bottom of the canister with the lead shield upon it. The pressure of the lead shield supplements the effect of atmospheric pressure in moving the extractive fluid through the chamber when an evacuated tube is positioned on the cannula.

In accordance with another aspect of the invention, the chamber is advantageously of unbreakable plastic material in order to prevent crackage that could allow the leakage of radionuclide substances. Further, in addition to conduits extending from the source to the chamber and from the chamber to the outlet member, the chamber has conduits to permit the loading of its substrate with a parent radionuclide with the chamber in position within the container of the self-contained generator unit. As a result, an operator who undertakes to load the substrate need not approach the shielded chamber by any closer than the length of the shorter loading conduit.

In accordance with still another aspect of the invention, the extracted radionuclide substance is tested for suitability without requiring dilution and nevertheless using conventional instrumentation. For this purpose the invention provides an assay tube which includes a capillary tube for reducing the extent of the test sample to a precisely measured and small magnitude amount. This significantly reduces the required range of the measuring instrumentation. In addition, the assay tube includes a standoff portion for separating the test sample from a measuring instrumentation by a precise distance to reduce the required range still further. Accordingly, the radioactivity of even a highly active sample is measurable by an intermediate-range instrument. The invention further provides a reference radionuclide substance which is proportioned in volume and activity to establish a normalized measure of radioactivity.

In accordance with a still further aspect of the invention, a composite test solution is used for determining in a single step whether or not radioactive molybdenum-99 is present in the output produce of a unit for generating radioactive technetium-99m. The composite solution is an aqueous solution of stannous chloride, hydrochloric acid and potassium thiocyanate. This solution eliminates the need for a multiplicity of test substances requiring multiple testing steps. When undesired radioactive molybdenum-99 is present, the composite solution causes a change in color of a test sample of technetium-99m eluate.

Other aspects of the invention will become apparent after considering several illustrative embodiments thereof, taken in conjunction with the drawings, in which:

FIG. 2 is a perspective view of the generating assembly for the unit of FIG. 1; and FIGS. 3A through 3C depict units for testing radionuclide substances produced by the self-contained generator of FIG. 1.

Figure 1:
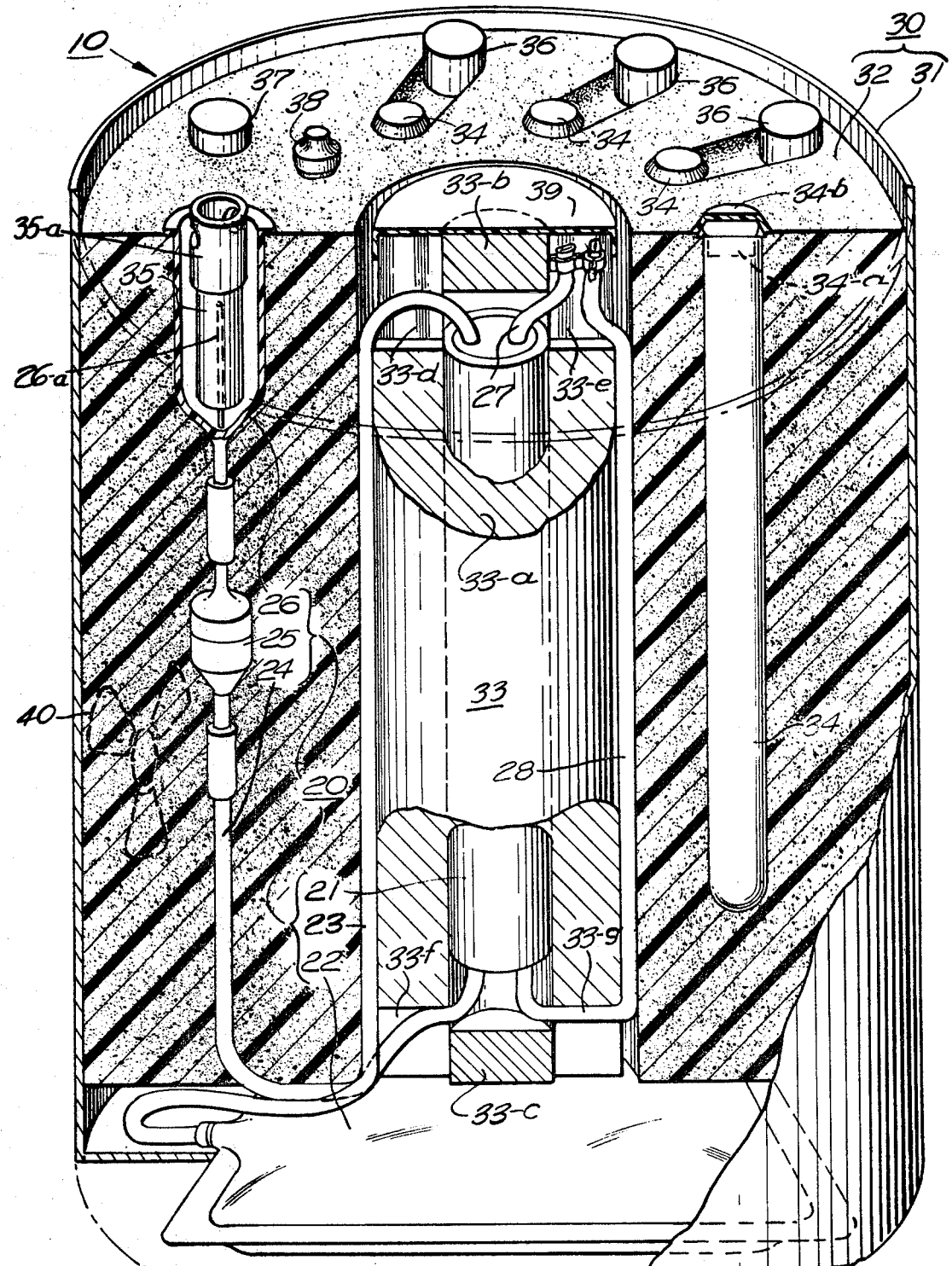
FIG. 1 is a perspective and cross-sectional view of a self-contained unit for generating radionuclide substances in accordance with the invention.

Turning to FIG. 1 a self-contained unit 10 in accordance with the invention for generating a daughter radionuclide substance on demand is constituted of a generating system or assembly 20 disposed in a composite packaging assembly 30.

The packaging assembly 30 includes an outer container 31 and an internal spacer 32. The latter is proportioned to accommodate the generating assembly 20, as well as various accessories 34 through 38 by which the desired daughter radionuclide substance is collected and subsequently tested for suitability.

The generator 10 is advantageously packaged as a hermetically sealed unit with a removable lid (not shown) for its outer container 31. In the embodiment of FIG. 1 the container 31 is a metallic canister and the spacer 32 is a multiapertured cylinder which, for weight considerations, is desirably of foam-plastic material such as polystyrene or polyurethane.

Within the radionuclide generator 10, a supply of a desired daughter radionuclide is available in a chamber 21 of the generating assembly 20 by virtue of the radioactive decay of a parent radionuclide. It is well known that many radionuclides, which also are known as radioisotopes, decay spontaneously into the other radionuclides. For example, radioactive molybdenum-99, as obtained from a nuclear reactor, spontaneously decays into an intermediate form of radioactive technetium ($T_c$-99m) which becomes technetium-99, as summarized by equation (1):

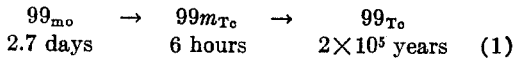

$$99_{mo} \rightarrow 99m_{Tc} \rightarrow 99_{Tc}$$
$$2.7 \text{ days} \quad 6 \text{ hours} \quad 2 \times 10^5 \text{ years} \quad (1)$$

where $^{99}Mo$ symbolizes radioactive molybdenum with an atomic weight of 99 and a half-life of 2.7 days; $99m_{Tc}$ symbolizes intermediate radioactive technetium with an atomic weight of 99 and a half-life of 6 hours; and $^{99}Tc$ symbolizes radioactive technetium with an atomic weight of 99 and a half-life of $2 \times 10^5$ years.

For the reaction symbolized in equation (1), radioactive molybdenum-99 is known as the parent radionuclide and intermediate technetium-99m is the daughter. Thus, molybdenum and intermediate technetium form a parent-daughter pair from which a relatively short-lived radionuclide is obtained from a longer-lived parent. There are numerous other parent-daughter pairs which are well known in the art for obtaining a daughter radionuclide from a parent of different half-life. Illustrative examples are set forth in Table I:

TABLE I

| Parent radionuclide | Daughter radionuclide | Use |
|---|---|---|
| Magnesium-28 | Aluminum-28 | Tracer. |
| Caesium-137 | Barium-137m | Dynamic studies. |
| Germanium-68 | Gallium-68 | Position scanning. |
| Tellurium-132 | Iodine-132 | Thyroid studies. |
| Yttrium-87 | Strontium-87m | Bone scanning. |
| Strontium-90 | Yttrium-90 | Therapy. |
| Tin-113 | Indium-113m | Scanning. |
| Barium-140 | Lanthanum-140 | Do. |

Since the chamber 21 of the generating assembly 20 contains radioactive materials, it is encased by a shield 33 of material such as lead. In the embodiment of FIG. 1 the shield 33 is formed by a cylinder 33–a with plugs 33–b and 33–c at the top and bottom. The wall of the cylinder contains upper apertures 33–d and 33–e and lower apertures 33–f and 33–g to permit access to the chamber 21. The various apertures 33–d through 33–g are advantageously proportioned so that their effect upon the shielding is negligible. The upper end of the shield 33 has a plastic cap 39 to cover the ends of the upper slots 33–d and 33–e. Besides the reduction in radioactivity at the exterior of the radionuclide generator 10 afforded by the shielding 33 an additional reduction in exterior radioactivity results from the use of the foam-plastic spacer 32. The symbol 40 on the outer surface of the container 31 indicates that the unit 10 contains radioactive substances.

In order to selectively extract the desired daughter radionuclide substance, a suitable fluid is passed into the radionuclide chamber 21. The composition of the fluid depends upon the particular radionuclide to be extracted. It has been theorized that in some instances, at least, the extraction takes place by the so-called elution of absorbed radionuclide particles. As a result, the terminology applicable to absorptive processes has been applied generally to the separation of a daughter radionuclide from its parent, regardless of the actual mechanism of extraction. Hence, the extractive fluid is commonly known as an eluant, and the solution of the eluant and the extracted radionuclide is designated as an eluate. It is also common practice to refer to the unit for producing daughter radionuclides as a cow.

The technique and mechanism in accordance with the invention for eluting, i.e. milking the desired daughter radionuclide from the chamber 21 are seen more clearly with reference to FIG. 2, which shows the generator assembly 20 detached from the packaging assembly 30.

The generator assembly 20 includes, in addition to the chamber 21, a source 22 of eluant, an inlet conduit 23 extending from the source 22 to the chamber 21, an outlet conduit 24, a filter unit 25, and an outlet member 26 at which the eluate containing the extracted daughter radionuclide can be collected on demand.

Conventionally the elution of a daughter radionuclide has entailed the use of many separate steps and components with the result that undesired contaminants have been able to enter at various stages of the generating process. In addition, there has been the possibility of using excessive quantities of eluant and eluants of incorrect composition and strength. However, as seen from the interconnection of components in FIG. 2, the generating assembly 20 extends continuously in a closed fashion from the source 22 to the outlet member 26. The closure of the generating assembly 20 is not affected by the presence of clamped loading conduits 27 and 28, whose use will be explained subsequently. Consequently, the eluate of the daughter radionuclide that is withdrawable by way of the outlet member 26 is relatively free from contaminants that would other wise be present.

Moreover, the eluant from the source 22 is of predetermined composition and amount, preventing errors that could otherwise occur. In addition, if the materials constituting the various components of the generating assembly 20, and particularly the source 22, are sterile and pyrogen-free, i.e. they do not contain the heat-resistant, polysaccharide by-products that characteristically accompany bacterial action, the generating assembly 20 is suitable for producing daughter radionuclide substances for use in nuclear medicine. The presence of pyrogens is undesirable with radionuclide substances which are injected into the body for scanning and other diagnostic purposes. Because of their resistance to heat, pyrogens are able to withstand the ordinary temperatures that are used in sterile practice employing autoclaves.

In order to apply the extractive fluid from the source 22 to the chamber 21, the invention provides a vacuum technique by which a collector in the form of an evacuated container is used in conjunction with the outlet member 26. For this purpose the generating assembly 20 is illustratively terminated in a cannula 26–a, while the fluid source 22 is nonvented and has a collapsible sidewall. The cannula 26–a enters the base of a cylindrical shell 26–b, which is open at its far end.

Returning momentarily to FIG. 1, the outlet member 26, including the cannula 26–a and the shell is inserted in a well of the spacer 32. When not being used in the elutive process, the cannula 26–a is illustratively maintained in a sterile condition by a sealing tube 35 which contains an antiseptic medium such as a solution of 70 percent alcohol. The sealing tube 35 has an attached collar 35–a that extends above the surface of the spacer 32 and has opposing slots to facilitate gripping and removal of the sealing tube from the cannula 26–a.

A representative evacuated container for withdrawing the desired daughter radionuclide from the generator 10 takes the form of one of the eluting tubes 34 shown in FIG. 1. Each eluting tube has a stopper 34–a and a sterilized tube cover 34–b. The stopper 34–a can be of rubber and the tube cover 34–b, which may be omitted, can be of plastic. For compactness, eluting tubes 34, of which only four are shown in FIG. 1, are stored in wells of the spacer 32.

To obtain a measure supply of eluate containing the desired daughter radionuclide, the sealing tube 35 is removed from the cannula 26–a and replaced by one of the eluting tubes 34, such as the particular tube 34' shown in FIG. 2. When the eluting tube 34' has an associated tube cover 34'–b (not shown in FIG. 2), the latter can be retained for subsequent testing in a fashion that will be described subsequently. Because of the vacuum in the eluting tube 34', the pressure at the source 22 is higher than at the outlet member 26. This causes the eluant in the source 22 to be drawn along the inlet conduit 23 into the chamber 21, where it becomes an eluate containing the desired daughter radionuclide. The eluate is then drawn into the outlet conduit 24, through the filter 25 and to the outlet member 26, where it enters the eluating tube 34' through the cannula 26–a. The vacuum in the eluating tube 34' desirably falls within the range from 30 percent to full vacuum.

Thus, the eluate is obtained in a semiautomatic fashion from the unit 10 of FIG. 1 by merely replacing the sealing tube 35 with one of the eluting tubes 34. To limit the radioactive exposure to the withdrawn eluate, the tube 34' is covered by a flexible shield (not shown). A suitable shield in the case of a technetium-99m eluate is in the form of a lead-loaded plastic tube that is equivalent to about one-eighth inch of lead and has a wall thickness on the order of three-eighths inch. Such a shield reduces the radiation from the eluate drawn into the shield by a factor of about 1000.

Turning to details of the chamber 21 in FIG. 2, it has a tubular body 21–a and upper and lower end caps 21–b and 21–c which are advantageously of a flexible, inert and readily sealable plastic material such as polyvinyl chloride. The inlet and outlet conduits 23 and 24 enter inlet and outlet ports of the caps 21–b and 21–c, as do loading conduits 27 and 28. The use of flexible plastic for the chamber 21 reduces the possibility that it will become fractured during use to permit the inadvertent escape of radioactive materials. The end caps 21–b and 21–c and the conduits 23, 24, 27 and 28 are sealed to the chamber 21 by a suitable plastic solvent such as cyclohexanone.

Within the tubular body 21–a, a parent radionuclide is supported by a columnar substrate 21–d. In a tested embodiment of the invention for generating the radioactive technetium-99m from radioactive molybdenum-99, the support substrate 21–d consisted of fine particles of aluminum oxide ranging in size from 40 and 100 microns on which radioactive molybdenum-99 had been precipitated. The substrate 21–d shown in FIG. 2 is sandwiched between upper and lower filters 21–e and 21–f. Between the filters and the end caps are respective fiberlike masses 21–g and 21–h. The latter are useful in promoting the distribution of fluid flow over the entire cross section of the columnar substrate 21–d; the filters also promote uniform flow and reduce the tendency of the flow to carry particles of the substrate from the chamber 21.

In a tested embodiment of the invention, the filters were porous polyethylene discs with a pore size of approximately 70 microns and the fiberlike masses were of glass wool. In addition, the chamber 21 took the form of a long column which was one-half inch in internal diameter and 3 inches in internal height, giving a ratio of the column diameter to height of approximately 1:6. This kind of relationship between column cross section and column height serves to promote the uniformity of distribution of fluid flow over the entire cross section of the column.

As shown in FIG. 2, a suitable configuration for the source 22 of eluant is a nonvented plastic bag. The bag 22 has an outlet port 22–a to which the inlet conduit 23 of the chamber 21 is sealably attached. In addition, the bag 22 has an inlet port 22–b to which a clamped inlet conduit 22–c is attached. The inlet conduit 22–c is used in filling the bag 22 with an eluant of suitable composition and amount. Once the bag 22 has been filled, the inlet conduit is clamped. The bag 22 is advantageously formed from two sheets of plastic material with a peripheral sealing edge or bead 22–d. In a tested embodiment of the invention for generating a technetium radionuclide daughter for use in nuclear medicine, the bag 22 was a sterile, pyrogen-free, 300-milliliter-capacity transfer pack manufactured by the Fenwal Laboratories of Morton Grove, Illinois. The bag was filled with 150 milliliters of sterile pyrogen-free physiological saline solution. The use of such a bag with two collapsible sidewalls facilitates the vacuum effect by which the eluant is drawn through the generating assembly 20.

In addition to having collapsible sidewalls, the bag 22 contains a predetermined amount of solvent, which is drawn through the chamber 21 at a rate governed by the microporous filter and the extent of the vacuum in the evacuated containers 34. This, in effect, controls the rate of flow through the substrate 21–d, and acts in conjunction with the fiberlike masses to prevent a breakdown by which the parent radionuclide could be carried into solution in the eluate. Moreover, the use of a source 22 with a preestablished supply of solvent prevents the use of an excessive amount of solvent and also prevents an error in the use of the correct solvent, either because of incorrect composition or concentration.

Also shown in FIG. 2 are the details of the outlet filter unit 25, which is for the purpose of controlling the rate of flow of the eluant drawn through the chamber 21 and assuring a bacteria-free eluate at the outlet member 26. In the embodiment of FIG. 2, the outlet filter unit 25 has a cone-shaped base portion 25–a containing a filter pad 25–b and is threadably connected and sealed to an internally apertured body portion 25–c. The apertured disc region of the body portion 25–c serves as a support for the filter pad 25–b during elution. An internal gasket 25–d promotes the seal between the base portion 25–a and the body portion 25–b. Coupling the filter unit 25 to the outlet conduit 24 and to the outlet member 26 are respective connectors 25–e and 25–f. In a tested embodiment of the invention the pad 25–b was a microporous sieve 13 mm. in diameter composed of biologically inert cellulose esters and was able to remove particles exceeding 0.22 microns in size. Since one role of the filter unit 25 is to assure the presence of a bacteria-free eluate, the pore size of its pad 25–b desirably falls at or below 0.45 microns, which is the reported limit on bacteria size. At the same time, the filter unit 25 controls the rate of flow of eluant through the column 21. For very slow rates of elution, the pore size of the pad 25–b may be as small as 0.01 microns. Thus, a suitable range for porosity of the pad 25–b is from 0.01 to 0.45 microns. Representative average rates of flow during elution range from 4 milliliters per minute to 1 milliliter every 5 minutes.

Considering the details of the particular interrelation between the generating assembly 20 and the packaging assembly 30 in FIG. 1, the inlet conduit 23 which carries the eluant from the source 22 is a plastic tube that extends along the inner wall of the spacer cylinder 32 and enters the shield 33 through an upper slot 33–d. Similarly, the outlet conduit is a plastic tube that exits from the shield 33 through a slot 33–f and extends through an aperture in the base of the spacer 32 to the outlet filter 25. The nonvented plastic bag 22 which serves as the source 22 of eluant, is positioned at the bottom of the canister 31. While the bag 22 may occupy any position in the canister, the bottom position has the advantage of having the weight of the shield 33 bear upon it. This produces pressure which promotes the flow of the eluant through the generating assembly 20 when an eluting tube 34 has been positioned on the cannula 26–a of the outlet member 26. All of the plastic constituents of the generating assembly 20 are desirably of the same type, such as polyvinyl chloride, but a mix of components can be used including such plastics as polyethelyene and polypropylene.

Turning to a consideration of the auxiliary conduits 27 and 28 shown in FIGS. 1 and 2, they are sued in loading the chamber 21 with the parent radionuclide. In the self-contained unit 10 of FIG. 1, the loading conduits 27 and 28 are shown with clamped ends disposed in one of the slots 33–e of the shield 33, having been sealed before the unit 10 is shipped to a destination for the local generation of a desired radionuclide. To activate the chamber before shipment, the conduits 27 and 28 are connected to a pumping unit (not shown). Since the chamber 21 is to be loaded with radioactive materials, the pumping unit is appropriately shielded.

In the case of a technetium generator, a suitable procedure for loading the chamber 21 with molybdenum begins by irrigating an aluminum oxide support medium 21–d with hydrochloric acid solution from the bottom of the column to top, i.e. into the long conduit 28 and out of the short conduit 27. The preliminary hydrochloric acid solution irrigation may be preceded by irrigation from bottom to top with saline solution. Such irrigations serve to remove air bubbles and loose substrate power from the chamber 21. In addition, the preliminary pass with hydrochloric acid readies the substrate 21-d for precipitation of the parent molybdenum-99 radionuclide, which is then passed in solution through the column from top to bottom.

One form of molybdenum solution for passage through the column is obtained by irradiating nonradioactive molybdenum oxide with thermal neutrons to produce molybdenum-99 oxide, which is dissolved in ammonium hydroxide and adjusted to a hydrogen-ion concentration of between 3-3.5.

Once the substrate has been wetted by the molybdenum solution, precipitation of them molybdenum upon the substrate is carried out by the flow, from top to bottom, of a suitable medium such as a 0.1 normal hydrochloric acid solution. A final irrigation of the alumina column 21-d takes place with saline solution from top to bottom to ready the chamber 21 for use. The final irrigation rinses out the acid, as well as any molybdenum that has been precipitated and additional fine particles of alumina.

As an alternative to loading the chamber 21 with molybdenum using the auxiliary conduits 27 and 28, the latter conduits may be omitted completely and loading can be accomplished using the inlet and outlet conduits 23 and 24 before their respective attachments to the source 22 and the filter unit 25.

It will be apparent that where the column is to support a different parent radionuclide, the substrate 21-d and various fluids and rinses are selected accordingly. For example, substrates of zirconia and silica may be employed. It will also be apparent that with some parent radionuclides the support medium takes other forms, including ion-exchange resins.

Because of the auxiliary conduits 27 and 28 the column 21 does not have to be handled directly during loading and the operator does not need to approach the column closer than the length of the upper conduit 27. In addition, the lead shield 33 and the spacer 32 provide substantial radiation protection during loading. In a tested embodiment of the invention, using a canister 6 inches in diameter with molybdenum-99 in the generating chamber, the respective wall thicknesses of the cylindrical shield 33 and the spacer 32 were three-fourths and 2 inches. The shield 33 reduced the radiation external to the canister from the chamber by a factor of 10; the separation between the shield and the canister provided by the spacer 32 gave an additional reduction in external radiation by a factor of 2.

Where the generator is to be used in nuclear medicine, it is important to keep the bacteria count to a low level. One sterile technique for loading the chamber with substrate, before it is activated, is to fill the chamber with alumina with the upper plug 21-b removed, insert and seal the upper plug, sterilize the chamber, insert it into the well of the spacer 32 in FIG. 1 and activate it with molybdenum solution which has been passed through a microporous filter in the manner described.

The insertion of the eluting tube 34' on the cannula 26-a of FIG. 2 is merely the first step in obtaining a desired daughter radionuclide substance. It is also necessary to measure the radioactivity of the extracted substance, as well as check for the undesired presence of the parent, which may have been carried inadvertently from the chamber 21.

The radioactivity of the extracted substance will determine the extent of its use. This is desirably measured with precision, particularly where the radionuclide substance is to be injected into the body for use in nuclear medicine. To determine the extent of the radioactivity of the eluate, the composite unit 10 of FIG. 1 includes, for each eluting tube 34, a companion assay tube 36. Each assay tube 36 is conveniently disposed in an adjoining well near the eluting tube 34 with which it is used.

A representative assay tube 36' is shown in FIG. 3A, as withdrawn from an assay well in the spacer 32 of FIG. 1. The assay tube 36' has a body section 36-a with one end proportioned to receive a compartment 36-b. The other end of the body section 36-a is open and proportioned to be inserted into a measuring instrument. When positioned in an assay well of the unit 10 in FIG. 1, the assay tube 36' has its open end at the base of the well and its compartment 36-b protrudes above the spacer 32 to facilitate removal. Within the compartment 36-b is a small capillary tube 36-c. It will be apparent that the capillary tube may alternatively be stored in the body section 36-c, in which case a cap (not shown) may be placed at the open end of the assay tube 36'.

The radioactivity of the daughter radionuclide substance extracted from the chamber 21 can be appreciable. Consequently, it is desirable to scale the measured radioactivity downwardly so that conventionally available instrumentation, such as a scintillation counting system, can be employed.

Ordinarily in using a scintillation counting system, a radioactive sample is diluted to reduce its radioactivity. This presents problems in obtaining precisely measured dilutions and increases the radiation hazard during measurement. However, using the assay tube 36' of FIG. 3A, the activity of the extracted substance is measured without diluting the sample while using a low-level counting system.

The capillary tube 36-c is used to obtain a precisely measured sample of small extent, thus significantly reducing the level of radioactivity of the measured substance. The barrel of the body section 36-a of the assay tube 36' constitutes a standoff distance $d$ for the measuring instrumentation permitting a further reduction in the monitored radioactivity.

In a tested model of the invention for assaying technetium-99m, the capillary tube 36-b had a capacity of one lambda, i.e. 1 microliter or 1/1000 of a milliliter. This gave a reduction by a factor of 1000 to the radioactivity associated with a conventional 1-milliliter sample. In addition, the standoff distance $d$ of the barrel of the main section 35-a was 3 inches, producing a further reduction in radioactivity by a factor of 35.

A step in the testing procedure is illustrated by FIG. 3B. The plastic cover 34'-b, that was retained when the tube 34' of FIG. 2 was removed from its well in the spacer 32 of FIG. 1, has a concave outer surface The eluting tube 34', with its flexible shield in place (not shown), is withdrawn from the cannula 26-b of FIG. 2, and the sealing tube 35 is replaced on the cannula as shown in FIG. 1. The eluting tube 34' is inverted several times after removal from the cannula 26-a. This has the effect of thoroughly mixing its contents. Using a sterile technique, a portion 41 of the eluate, for example one-tenth milliliter, is withdrawn by a syringe (not shown) and ejected into the cap cover 34'-b of FIG. 3A.

The capillary tube 36-c is then removed from the compartment 36-b of the assay tube 36' and held at an angle to the vertical by forceps 42 or some other suitable holder, in the eluate 41 in the cap cover 34'-b. When the capillary tube is full, it contains a reduced, but precise amount of the eluate, for example, 1 microliter. The capillary tube 36-c is then returned to the compartment 36-b, which is in turn replaced on the body section 36-a. The open end of the assay tube 36' is then positioned with respect to monitoring instrumentation, such as the well scintillation arrangement 50 of FIG. 3C. Such a system includes a so-called well scintillation counter 51, which is a lead-shielded chamber in which are produced electrical impulses in accordance with the radioactivity of the sample in its well 52. In one form of counter 51, a crystal which responds to radiation by emitting light is optically connected to a photoelectric cell which converts the emitted light into electrical impulses. The impulses produced in the chamber 51 are conveyed to a scaler 53 by a connecting cable 54. The scaler is a standard electronic instrument which periodically records 1 impulse out of a specified number of nuclear disintegrations in the chamber 51. Thus, the indicating instrument 53 "scales" the activity monitored by the associated chamber 51.

In using the assay tube 36' with the scintillation arrangement 50 of FIG. 3C, the uncapped end of the tube 36' is inserted into the well 52 so that the compartment 36-b containing the eluate-filled capillary tube 36-c is away from the well 52 by the standoff distance *d*. In addition, the capillary tube 36–*c* occupies a reproducible position within the chamber 36–*b*, such as the slanting position shown in FIG. 3C. The latter position is assumed by lightly tapping the side of the chamber 36–*b* before the scaler is read. The relative scale of the tube 36′ with respect to the counter well 52 has been greatly exaggerated for the sake of clarification. In the case of assaying technetium99m, the scaler 53 is set in conventional fashion with its base line between 50 and 100 kev since technetium99m has an energy of 140 kev.

To calibrate the reading of the scaler 53, the invention provides a reference assay tube 37, shown positioned in a well of the spacer 32 of FIG. 1. The reference assay tube 37 is similar in configuration to the assay tubes 35, except that its capillary tube (not shown) is filled with a cobalt–57 standard with a radioactivity that corresponds at the monitoring instrument 50, to an activity, within 5 percent, of 1.0 millicurie per milliliter of technetium–99m. The required amount of cobalt–57 is that which produces the same instrument indication as a sample of technetium–99m with a known activity of 1.0 millicurie per milliliter. The reference assay tube 37 may be color-coded to distinguish it from the assay tubes 35. Consequently, the activity of the generated eluate is directly established, without having to use scale and sensitivity factors, by dividing the count indicated by the scaler 53 for a prescribed interval of time by the corresponding count for the reference tube 37. The associated formula for establishing the activity A of the eluate in millicuries per milliliter is given by equation (2):

$$A = \frac{N_E}{N_S} \pm 10\% \qquad (2)$$

where $N_E$ is the indicated count for the eluate for a prescribed interval of time, and $N_S$ is the indicated count for the standard for the same interval of time.

In the case of radioactive technetium–99m, a representative assay is 2.0 millicuries per milliliter, and a typical injection for scanning purposes in nuclear medicine is between 2.0 and 10.0 millicuries. Thus, if a 10-millicurie injection is desired and the assay is 2.0 millicuries per milliliter, 5 milliliters are injected.

It will be apparent that a wide variety of alternative instrumentation may also be employed in measuring the radioactivity of an eluate generated in accordance with the invention, while employing the assay tube 36′. For example, the assay tube 36′, with an eluate-loaded capillary tube in its compartment 36–*b*, may be positioned with respect to a radioisotope scanner of the kind used in nuclear medicine, and the scanner may be used to obtain an estimate of its content of radioactivity. In addition, the sample used to fill the capillary tube may be placed in one of the cavities of a multicavity tray instead of the plastic cap 34′–*b* of FIG. 3B.

In any case, the eluate is desirably tested for breakthrough of its parent radionuclide before being injected. Where technetium–99m is the daughter radionuclide and is to be injected into the body, such a test is mandatory since the parent molybdenum–99 may be toxic in excessive amounts.

The invention provides for testing for a breakthrough of molybdenum using a single test solution, in place of the multiplicity of separate testing solutions usually required. This is accomplished using a dropper vial 38, which is also positioned in one of the wells of the spacer 32 of FIG. 1. Several droplets of test solution are applied to the eluate in the cover 34′–*b* of FIG. 3 from the vial 38. A change in color to pink indicates the undesired presence of the parent radionuclide. Alternatively, when a multicavity tray is employed for the test sample, the cavity is filled to a first predetermined level to provide a sample for assay purposes and is then filled to a second level to test for the presence of molybdenum–99.

The composite test solution for molybedenum–99 is an aqueous solution of stannous chloride, potassium thiocyanate, and hydrochloric acid. Representative proportions for approximately a 100-milliliter amount of the composite solution are within the ranges shown by Table II:

TABLE II

| Ingredient | Amount |
| --- | --- |
| Stannous chloride ($SnCl_2$) | 1–10 grams. |
| One molar hydrochloric acid solution (1.0M HCl). | 5–20 milliliters. |
| Potassium thiocyanate (KSCN) | 5–25 grams. |
| Water ($H_2O$) | To complete a volume of 100 milliliters. |

In a particular solution for testing for the undesired presence of molybdenum–99 in an eluate of technetium–99m, ingredients were 10 grams of stannous chloride, 5 milliliters of molar hydrochloric acid solution, 5 grams of potassium thiocyanate and 100 milliliters of water. It has been determined experimentally that the limit of detection using the foregoing test solution is approximately 1.0 microgram of molybdenum–99 per milliliter of technetium–99m.

Other adaptations and modifications of the invention will occur to those skilled in the art.

I claim:

1. In a method of generating an eluate containing a desired daughter radionuclide by flowing an eluant, which is selectively solvent of said daughter radionuclide, from a source of said eluant to and through a chamber containing a parent radionuclide which spontaneously decays into said daughter radionuclide, and from said chamber to an outlet for said chamber, the improvement comprising applying a vacuum to said outlet to draw said eluant from said source into and through said chamber and from said chamber out of said outlet, thereby to generate said eluate containing said daughter radionuclide on demand by applying said vacuum at said outlet.

2. A method according to claim 1, said vacuum being applied by coupling in a closed fashion with said outlet the interior of a sealed, evacuated eluate collecting container, to thereby draw said eluate out of said outlet into said evacuated container.

3. A method according to claim 2, said outlet being connected in closed fashion with a cannula, and said evacuated container having a pierceable wall, said evacuated container being coupled to said outlet by impaling said pierceable wall on said cannula to thereby apply said vacuum in said evacuated container to said source.

4. A method according to claim 1, said source being a flexible, collapsible bag containing a predetermined amount of sterile eluant.

5. A method according to claim 4, including controlling the rate of flow of said eluate and removing any particulate matter which might be present in said eluate by passing said eluate through a microporous filter.

6. A method according to claim 1, said vacuum drawing said eluant from said source, to and through said chamber and outlet in a closed system.

7. A method according to claim 6, said source having a flexible sidewall.

8. A method according to claim 6, said vacuum drawing said eluant from said source, to and through said chamber and said outlet without venting.

9. In a method of generating an eluate containing a desired daughter radionuclide by flowing an eluant, which is selectively solvent of said daughter radionuclide, from a source of said eluant to and through a chamber containing a parent radionuclide which spontaneously decays into said daughter radionuclide and from said chamber to an outlet for said chamber, the improvement comprising applying a vacuum to said outlet by coupling with said outlet the interior of a sealed evacuated collecting container to thereby draw said eluant from said source through said chamber and out of said outlet into said collecting container.

10. A method according to claim 9, said outlet being connected to a cannula and said evacuated collecting container having a pierceable wall, said evacuated container being coupled to said outlet by piercing said pierceable wall with said cannula to thereby apply said vacuum in said evacuated container to said outlet.

11. A method according to claim 9, said system being internally sterile, whereby said eluant withdrawn from said outlet into said collecting container is sterile.

12. A method according to claim 9, said eluant being drawn from said source through said chamber and into s aid evacuated container in a closed system.

13. A method according to claim 12, said eluant being drawn from said source through said chamber and into said evacuated container without venting.

14. A radionuclide generator system for generating a relatively short-lived daughter radionuclide from a longer-lived parent radionuclide which is spontaneously decayable into said short-lived daughter radionuclide, comprising a generator chamber containing said parent radionuclide and said daughter radionuclide supported on a substrate, said chamber having an inlet for inletting an eluant for selectively eluting said daughter from said chamber in the form of an eluate of said eluant and said daughter, and an outlet for outletting said eluate, a container containing a prepackaged and predetermined supply of said eluant and conduit means connecting said container to said inlet to provide a closed system from said container to said generator, said system including means for establishing a pressure differential between said eluant container and said outlet to force eluant through said chamber to form said eluate and to withdrawn said eluate from said outlet, by applying a vacuum to said outlet.

15. A system according to claim 14, wherein said eluant container has at least one collapsible sidewall.

16. A system according to claim 15, wherein said eluant container comprises an internally sterile and substantially pyrogen-free, flexible collapsible bag, wherein said eluant supply is sterile and substantially pyrogen-free and wherein said system is internally sterile.

17. A system according to claim 14 having an eluate withdrawing and collecting station for withdrawing and collecting eluate from said outlet and conduit means connecting said eluate collecting station with said outlet to provide a closed, system communicating therebetween, whereby said system is closed from container to eluate collecting station and whereby an eluate of said daughter is obtainable at said eluate collecting station to thereby provide a self contained generator system, said system being internally sterile.

18. A system as defined in claim 17, said conduit means connecting said generator outlet and said eluate collecting station having means for removing any particulate matter, which may be present in said eluate and to control the rate of flow of eluant through said generator chamber.

19. A system as defined in claim 18, said means for removing particulate matter comprising a microporous filter.

20. A system according to claim 19, wherein said microporous filter has a pore size of between 0.2 and 0.45 microns.

21. A radionuclide generator system for generating a relatively short-lived daughter radionuclide from a longer-lived parent radionuclide which is spontaneously decayable into said short-lived daughter radionuclide, comprising a nonvented generator chamber containing said parent radionuclide and said daughter radionuclide supported on a substrate, said chamber having an inlet for inletting an eluant for selectively eluting said daughter from said chamber in the form of an eluate of said eluant and said daughter, and an outlet for outletting said eluate, a nonvented container containing a prepackaged and predetermined supply of said eluant and conduit means sealably connecting said container to said inlet to provide a closed nonvented system from said container to said generator, said system including means for establishing a pressure differential between said eluant container and said outlet to force eluant through said chamber to form said eluate and to withdraw said eluate from said outlet.

22. A system according to claim 21, said means for establishing a pressure differential including means for establishing a vacuum at said outlet to thereby draw said eluant through said chamber.

23. A system according to claim 22, said means for establishing a vacuum comprising an evacuated, sealed eluate collecting container at a predetermined vacuum and means for establishing closed system communication between said evacuated container and said outlet to withdraw eluate from said outlet.

24. A system according to claim 23, said means for establishing communication between said evacuated container and said outlet comprising a cannula sealably connected to said outlet by a conduit to provide a nonvented, closed system therebetween said evacuated container having a pierceable wall, whereby penetration of said pierceable wall by the cannula automatically causes said eluant to be drawn through said chamber into said evacuated container.

25. A system according to claim 24, said cannula having means for normally and sterility closing the same, said last mentioned means being removable from said cannula.

26. A system according to claim 21, said eluant container comprising a flexible, collapsible bag.

27. A system according to claim 26, having an eluate withdrawing and collecting station for withdrawing and collecting eluate from said outlet and conduit means sealably connecting said eluate collecting station with said outlet to provide a closed, nonvented system therebetween, whereby said generator system is closed from said eluant container to said eluate collecting station, said generator system including means for applying a vacuum to said eluate collecting station to withdraw eluant into and through said generator chamber and to said collecting station.

28. A system according to claim 27, said collecting station comprising a cannula and said means for applying a vacuum comprising a sealed, evacuated eluate collecting container having a pierceable wall adapted to be impaled on said cannula, whereby eluant is automatically withdrawn from said eluant container through said generator chamber and out said cannula into said evacuated container.

29. A system according to claim 28, said conduit means connecting said outlet and said collecting station having means to control the rate of flow from said eluant container and through said chamber and to remove any particulate matter which may be present in said eluate.

30. A system according to claim 29, said means for controlling rate of flow and removing particulate matter comprising a microporous filter.

31. A radionuclide generator system for generating a relatively short-lived daughter radionuclide from a longer-lived parent radionuclide, which is spontaneously decayable into said short-lived daughter radionuclide, comprising a sealed generator chamber containing said parent radionuclide and said daughter radionuclide, said chamber having an inlet for inletting an eluant for said daughter radionuclide to form an eluate of said daughter radionuclide in said eluant and an outlet for outletting said eluate, a sealed container containing a prepackaged supply of said eluant, said system being packaged with means sealably connecting said container with said inlet to provide a closed system communicating therebetween whereby said generator and container sealably attached thereto form a closed generator system and whereby said eluant is adapted to be withdrawn from said container into and through said generator without venting said system during said withdrawal said system including means for establishing a pressure differential between said eluant container and said outlet to force eluant through said chamber to form said eluate and to withdraw said eluate from said outlet.

32. A system according to claim 31, said container comprising a sealed, flexible, collapsible bag containing a predetermined amount of said eluant.

33. A system according to claim 32, including an eluate withdrawing and collecting station spaced from said outlet and conduit means sealably connecting said outlet with said collecting station to provide a closed system therebetween.

34. A system according to claim 33, wherein said withdrawing station comprises an eluate collecting cannula, whereby a vacuum may be applied to said outlet by impaling a pierceable wall of an evacuated eluate collecting container on said cannula to thereby draw said eluant through said generator chamber and withdraw said eluate from said cannula.

35. A system according to claim 34, said conduit means connecting said generator chamber with said cannula having therein means for controlling the rate of flow of eluant through said generator chamber and for removing any particulate material which may be present in said eluate.

36. A packaged radionuclide generator system for generating a relatively short-lived daughter radionuclide from a longer-lived parent radionuclide, which is spontaneously decayable into said short-lived daughter radionuclide, comprising a generator chamber containing said parent radionuclide and said daughter radionuclide said chamber having an inlet for inletting eluant for said daughter radionuclide to form an eluate of said daughter radionuclide in said eluant, and an outlet for outletting said eluate from said chamber, a source of eluant, conduit means connecting said source with said inlet, an eluate collecting station spaced from said outlet and conduit means sealably connecting said outlet with said station to provide a closed self-contained system therebetween, said system being packaged with said last mentioned conduit means sealably connecting said generator with said station and with said station supported at a level above said source of eluant.

37. A system according to claim 36, said station being a cannula, which is exposable for impaling thereon a pierceable wall of an evacuated sealed eluate collecting container.

38. A packaged, self contained composite radionuclide generator system for the local generation of a short-lived daughter radionuclide from a longer-lived parent radionuclide, which is spontaneously decayable into said short-lived daughter radionuclide, comprising a container for said generator system, a sealed generator chamber located in said container and containing a column of medium supporting said parent radionuclide and said daughter radionuclide generated therefrom, a confined source of a predetermined amount of said eluant located in said container for eluting the radionuclides in said chamber to selectively extract said daughter radionuclide therefrom, first conduit means located within said container sealably connecting said source of eluant with said column to provide a closed conduit therebetween, an eluant collecting station supported within said container and second conduit means located within said container sealably connecting said collecting station with said column to provide a closed conduit therebetween, whereby said source, generator chamber, collecting station and conduit means collecting the same are all packaged in closed communication with each other as a self contained unit in said generator system container said source of eluant being supported in said container below the level of said station.

39. A system according to claim 38, said column being located within a shield for reducing external radiation from the radionuclides, spacer means within the container for positioning the shielded column in the container and spacing it inwardly from the container wall to further reduce the radioactivity external thereto.

40. A system according to claim 39, wherein said shielding means comprises a cylinder of radioactive shielding material encasing said column, said generator container comprising a canister and said means for positioning and spacing said shielded column comprising a cylinder of plastic material with a central well receiving said cylinder of shielding material containing said column, to thereby further reduce radiation external to said generator container.

41. A system according to claim 40, wherein said withdrawing station comprises a cannula disposed in a well in said spacing means in which a sealed evacuated eluate collecting container with a pierceable wall is adapted to be placed to impale said pierceable wall on said cannula so that said cannula penetrates said pierceable wall to apply a vacuum to said cannula and thereby draw said eluant through said column and out of said cannula into said evacuated container.

42. A system according to claim 41, wherein said spacing means includes a plurality of wells containing therein at least one of said evacuated eluate collecting containers for impalement on said cannula.

43. A radionuclide generator system for generating a relatively short-lived daughter radionuclide from a longer-lived parent radionuclide comprising a generator chamber containing said parent radionuclide and said daughter radionuclide supported on a substrate, means for inletting into said chamber an eluant for selectively eluating said daughter from said chamber in the form of an eluate of said eluant and said daughter and means for outletting said eluate from said chamber, a source of said eluant and means for establishing a vacuum at said outlet means comprising an evacuated, sealed eluate-collecting container and means for coupling said evacuated container to said outlet means to thereby apply a vacuum to said outlet means and draw said eluate from said source through said chamber and out of said outlet means into said sealed evacuated container.

44. A system according to claim 43, said means for coupling said evacuated container to said outlet comprising a cannula connected to said outlet, said evacuated container having a pierceable wall for penetration by said cannula to thereby cause said eluate to be drawn into and through said generator and outlet into said evacuated container.

45. A system according to claim 43, which is internally sterile, whereby said eluate withdrawn from said outlet means into said collecting container is sterile.

46. A system according to claim 43, said system being closed from said source to said evacuated container.

47. A system according to claim 46, said system being nonvented from said source to said evacuated container.